Dec. 16, 1941.   J. W. EMMONS   2,266,593
METHOD OF MAKING LOCK JOINTS
Filed Sept. 20, 1939
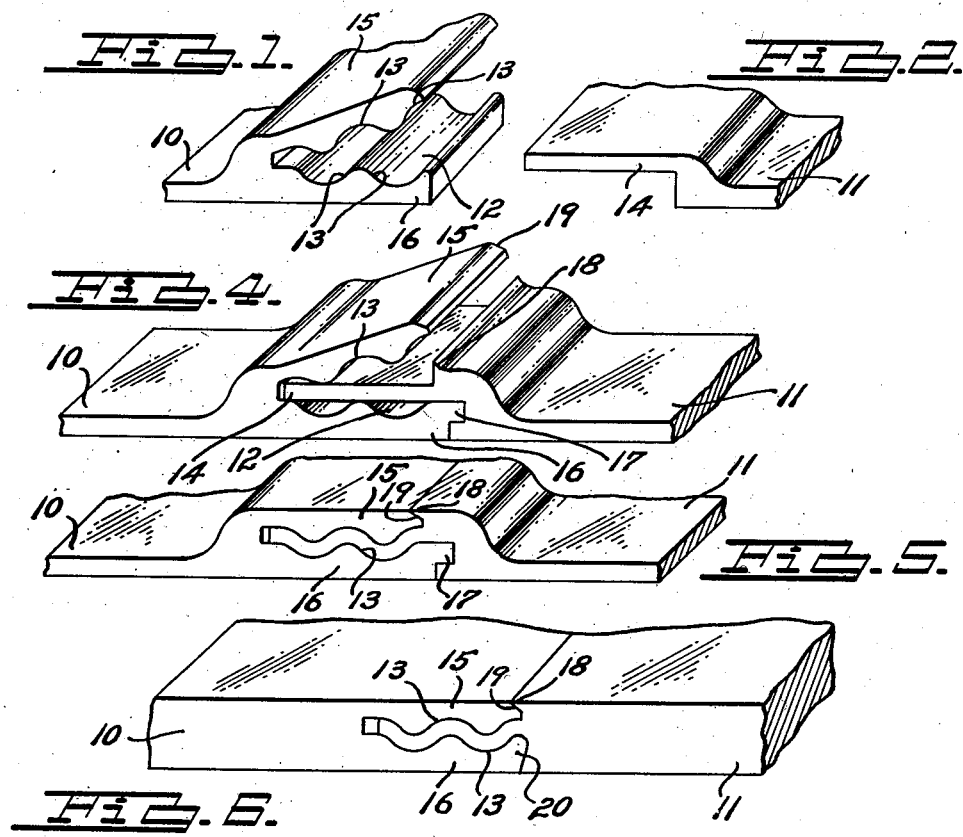
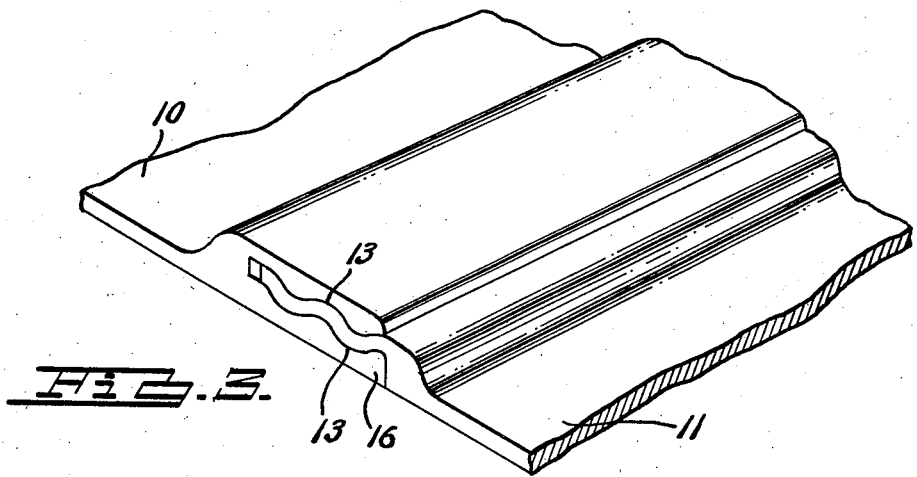
INVENTOR.
James W. Emmons
BY
Ramsey, Kent, Chisholm and Lutz
ATTORNEYS.

Patented Dec. 16, 1941

2,266,593

UNITED STATES PATENT OFFICE 2,266,593

METHOD OF MAKING LOCK JOINTS

James W. Emmons, Detroit, Mich., assignor to Bohn Aluminum & Brass Corporation, Detroit, Mich., a corporation of Michigan Application September 20, 1939, Serial No. 295,742

3 Claims. (Cl. 29—148)

This invention relates to an improved lock joint for joining two members and to a method of forming the same.

A particular feature of the invention resides in the fact that the joint formations are parts homogeneously united to the two members to be joined, and after the joint is formed the parts show only a single exposed seam on each side of the joint.

Other features of the invention reside in the fact that the surfaces of the two parts joined lie in a flat plane, unbroken by projections on one or both sides of the joint; and that the method of forming the joint is such that it can be made quickly and cheaply.

Other objects and advantages of the invention will become apparent as the description proceeds. While preferred forms are disclosed herein for purposes of illustration, it should be understood that various changes may be made in the structure without departing from the invention.

In the drawing:

Fig. 1 is a fragmentary perspective of one member of the joint.

Fig. 2 is a fragmentary perspective of the other member of the joint.

Fig. 3 is a perspective view of the joint produced by uniting the parts shown in Figs. 1 and 2.

Fig. 4 is a perspective of a partially assembled joint showing a modification.

Fig. 5 is similar to Fig. 4 but shows the joint after completion.

Fig. 6 is a perspective of a completed joint showing additional modifications.

Referring to the drawing more particularly, Fig. 3 shows one form of the invention in which metal parts 10 and 11 are united by a joint of the present invention. The parts to be joined carry joint formations as indicated in Figures 1 and 2.

Fig. 1 shows that the part 10 is formed along the edge to be joined with a groove 12, the upper end and lower surfaces of which are corrugated with the ridges of the corrugations running parallel to the edge of the sheet as shown at 13, so that the groove may be said to be sinuous in cross section. The corrugations 13 are present for the full length of the part 10.

The other metal part 11 has projecting from the edge to be joined a tongue 14 which is spaced upwardly a sufficient distance from the lower surface of sheet 11 as to lie opposite the groove 12 when sheets 10 and 11 lie on a common surface.

The joint formations of Figures 1 and 2 may be produced in any suitable manner, but it is preferred to form them by an extrusion process. Thus, when parts 10 and 11 are extruded from aluminum, or some other extrudable metal, the joint formations as illustrated in Figs. 1 and 2 are present on the edges of the parts 10 and 11 as they come from the extrusion press.

After the parts 10 and 11 have been thus formed they are assembled by inserting the tongue 14 in the groove 12. Pressure is then applied to the upper and lower surface of part 10 adjacent the groove 12 to close the jaws 12 upon the tongue 14. This pressure is applied by rolling or similar operation until the parts assume the position of Fig. 3. During this pressure the tongue 14 is conformed to the sinuous groove 12, which action pulls the main body of part 11 closely against part 10 and firmly interlocks the tongue 14 in the groove 12.

If the parts are of sufficiently strong material the joint thus formed will remain tight against all ordinary strains encountered by the joint, but in case it is desired to further protect the joint against outward opening of the joint parts 15 and 16, these parts may be interlocked with the body of sheet 11. Thus, in Fig. 4 the lower jaw 16, which originally lies flush with the lower surface of the part 10, has dovetailed engagement at 17 with the part 11, and the upper surface of the part 11 carries a rib 18 which in the operation of closing the joint is rolled over a beveled edge 19 formed on the upper lip 15. The parts thus assembled reach the final positions illustrated in Fig. 5. It will be clear in this form that the jaws 15 and 16 are positively retained against opening outwardly from the joint.

Other equivalent interlocking formations may be used as shown in Fig. 6 where the tongue 16 has a tapered interlock 20 with the member 11.

The joint of this invention is particularly useful in joining parts which have relatively thin walls, in which case the joint formations are incorporated in raised beads or ribs which extend along the joint edges. However, in case the walls of the parts 10 and 11 are of sufficient thickness, these raised beads are unnecessary, in which case the joint formations would extend from parts 10 and 11 in the manner shown in Fig. 6.

In the preferred forms of the invention the lower surface of the parts 10 and 11 lie in the same plane when joined so that on the under surface the joint is visible merely as a single crack in a continuous surface. In the form illustrated in Fig. 6 this is also true of the upper surfaces of the parts 10' and 11'.

While the sinuous cross sectional form of the groove 12 is at present preferred, it should be understood that other sections that provide locking formations may be used, and that the tongue may also be pre-formed with some locking formations if desired.

The joint of the present invention can be formed in a cheap and expeditious manner, since the joint formations result from the extruding operation and require no extra operation. The assembling and rolling down of the joint is obviously a simple and inexpensive step.

Throughout the claims the term "joined edge" refers to edges of the joined members which confront each other.

I claim:

1. The method of making a lock joint between two metal members which comprises forming one of the joined edges of one of the members with a straight tongue, forming the joined edge of the other member with an open groove having upper and lower halves, inserting the tongue in the groove and simultaneously bending down the top half to close the groove upon the tongue and bending the tongue to fit the groove, thereby drawing the joint edges of the two members firmly together and locking the tongue in the groove.

2. The method of making a lock joint between two metal members which comprises extruding one of the members with a flat tongue projecting from the joined edge, extruding the other member with a groove having an irregular cross section, inserting the tongue in the groove, and simultaneously bending down the top half of the groove upon the tongue and bending the tongue to fit the groove, thereby drawing the joined edges of the two members firmly together and locking the tongue in the groove.

3. The method of making a lock joint between two members which comprises extruding one of the members with a flat tongue projecting from the joined edge, extruding a plurality of complementary corrugations on the inner surfaces of a groove in the other member, inserting the tongue in the groove, bending the said surfaces towards one another and simultaneously bending the tongue to conform to the corrugations and securing it in fixed relation between the inner surfaces.

JAMES W. EMMONS.